(12) United States Patent
Gupta et al.

(10) Patent No.: US 9,251,003 B1
(45) Date of Patent: Feb. 2, 2016

(54) DATABASE CACHE SURVIVABILITY ACROSS DATABASE FAILURES

(71) Applicant: Amazon Technologies, Inc., Seattle, WA (US)

(72) Inventors: Anurag Windlass Gupta, Atherton, CA (US); Pradeep Jnana Madhavarapu, Mountain View, CA (US); Matthew David Allen, Seattle, WA (US); Laurion Darrell Burchall, Seattle, WA (US); James McClellan Corey, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 343 days.

(21) Appl. No.: 13/967,185

(22) Filed: Aug. 14, 2013

(51) Int. Cl.
*G06F 11/14* (2006.01)
*G06F 17/30* (2006.01)

(52) U.S. Cl.
CPC ........ *G06F 11/1412* (2013.01); *G06F 11/1469* (2013.01); *G06F 11/1441* (2013.01); *G06F 17/30132* (2013.01); *G06F 2201/84* (2013.01)

(58) Field of Classification Search
CPC ............ G06F 11/1417; G06F 11/1438; G06F 11/1441; G06F 11/1469; G06F 2201/82; G06F 2201/84; G06F 17/30132
See application file for complete search history.

(56) References Cited

U.S. PATENT DOCUMENTS

| | | | | |
|---|---|---|---|---|
| 5,043,866 A | * | 8/1991 | Myre, Jr. | G06F 11/1471 |
| 5,333,303 A | * | 7/1994 | Mohan | G06F 11/1471 714/20 |
| 5,414,840 A | * | 5/1995 | Rengarajan | G06F 11/1471 |
| 5,907,678 A | * | 5/1999 | Housel, III | H04L 29/06 709/213 |
| 6,088,773 A | * | 7/2000 | Kano | G06F 11/1407 711/146 |
| 6,490,594 B1 | * | 12/2002 | Lomet | G06F 17/3048 |
| 8,397,032 B2 | | 3/2013 | Elnozahy | |
| 8,806,617 B1 | * | 8/2014 | Johnson, III | G06F 21/00 726/22 |
| 9,021,087 B1 | * | 4/2015 | Weng | H04L 67/1095 709/213 |
| 9,075,754 B1 | * | 7/2015 | Sadhu | G06F 11/1451 |
| 2003/0182253 A1 | * | 9/2003 | Chen | G06F 17/30067 |
| 2005/0192995 A1 | * | 9/2005 | Li | G06F 17/30345 |
| 2006/0143239 A1 | * | 6/2006 | Battat | G06F 17/30371 |

(Continued)

OTHER PUBLICATIONS

Yuan Xie "Emerging NVM Memory Technologies", Penn State Department of Computer Science and Engineering, Downloaded from http://web.engr.oregonstate.edu/~sllu/xie.pdf on Aug. 13, 2013, pp. 1-31.

(Continued)

*Primary Examiner* — Joseph Schell
(74) *Attorney, Agent, or Firm* — Robert C. Kowert; Meyertons, Hood, Kivlin, Kowert & Goetzel, P.C.

(57) ABSTRACT

A database system may implement database cache survivability across database failures. In various embodiments, a database cache may be maintained independent of a failure of a database. A database cache may be maintained in a non-volatile memory device or maintained in a shared memory segment of system memory. Upon recovery from a database failure, a recovery point may be determined that indicates a consistent state of the database. Cache entries of the database cache inconsistent with the consistent state of the database may be invalidated, and the database cache may be made available for access requests directed toward the database. Valid cache entries from before the database failure may be made available without accessing a back-end data store for the database.

20 Claims, 8 Drawing Sheets

(56) References Cited

U.S. PATENT DOCUMENTS

| | | |
|---|---|---|
| 2012/0054447 A1 | 3/2012 | Swart et al. |
| 2012/0310985 A1 | 12/2012 | Gale et al. |
| 2012/0310986 A1 | 12/2012 | Frantz et al. |
| 2012/0310991 A1 | 12/2012 | Frantz et al. |
| 2013/0060810 A1* | 3/2013 | Maman ............... G06F 17/3048 707/769 |

OTHER PUBLICATIONS

"NV-DIMM: Fastest Tier in Your Storage Strategy", 2012 Whitepaper, Viking Technology, pp. 1-7.

* cited by examiner

DATABASE CACHE SURVIVABILITY ACROSS DATABASE FAILURES

BACKGROUND

As increasing amounts of data are stored and maintained for a variety of different purposes, optimizing the performance of access requests and other operations performed by database systems with regard to stored data is becoming increasingly important when handling larger amounts of data and greater numbers of access requests. Typically, database systems have implemented database caches that are efficient to access and/or modify. However, in order to maintain their efficiency database caches are generally implemented in a ways that leaves data maintained in the database cache vulnerable to loss to due to system or process failure. Upon losing data maintained in a database cache, the burden on database systems to respond to access requests, as well as perform other management operations, increases dramatically.

Figure 1A:
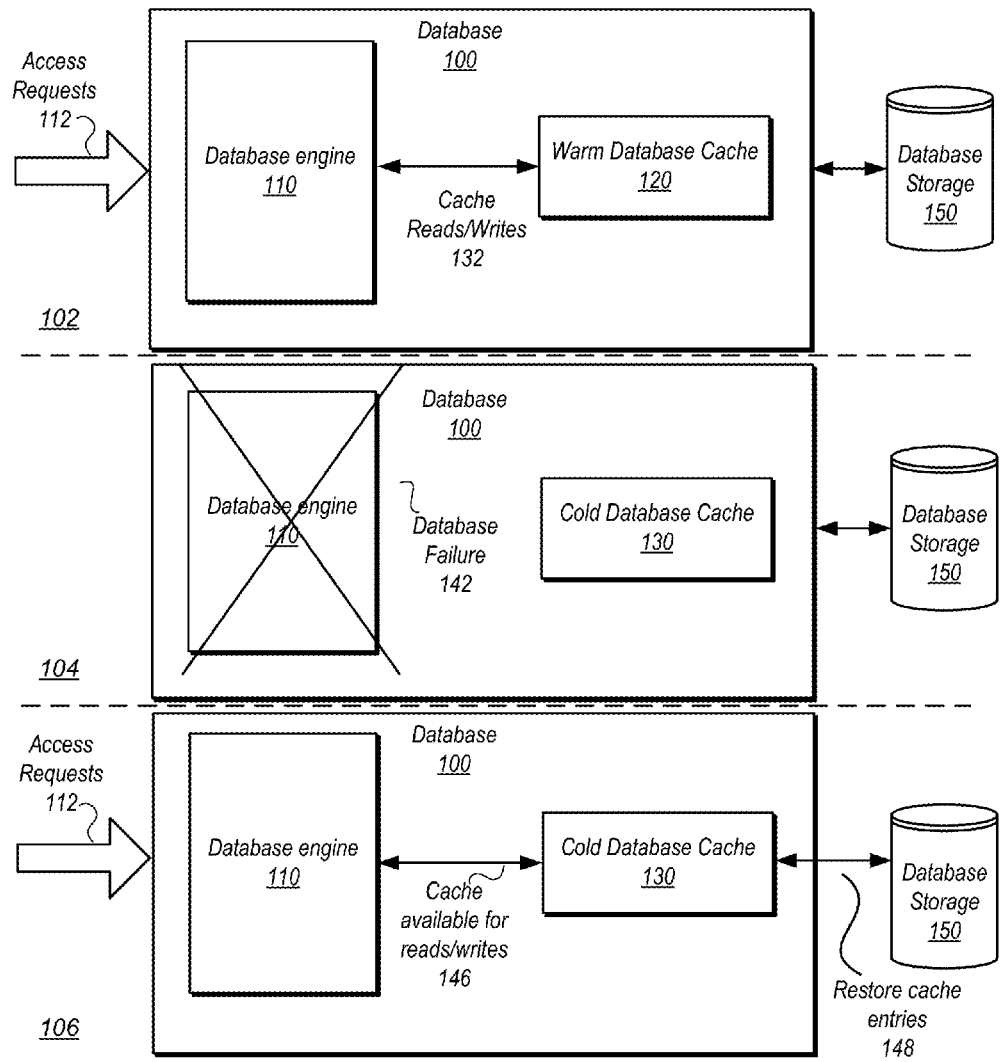
FIG. 1A is a series of block diagrams illustrating a database cache without survivability across database failures.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of database cache survivability across database failures are disclosed herein. As part of optimizing the performance of access operations of a database system, such as read and write operations, database systems may implement a database cache. A database cache may generally be a copy or version of data stored for a database system that may be more efficiently accessed by a database system to process access requests, instead of accessing the data in persistent database storage which may be less efficient (e.g., slower). When an access request is received, a database system may first evaluate a database cache to determine if the requested data associated with the access request is also stored in the database cache. If yes (often termed a cache hit), then the access request may be processed utilizing the data maintained in the database cache without accessing data stored in persistent database storage for the database system. If not (often termed a cache miss), persistent database storage may be accessed to process the access request. Often times, the data accessed in persistent database storage may then be copied to the database cache to process future access requests. Over time, copying data accessed for cache misses to the database cache allows the database cache to become warm.

A warm database cache maintains data that may be frequently used to process access requests, saving time and resources for the database system as data need not be obtained from persistent database storage. Typically, a database cache is implemented in volatile memory, such as various types of system memory, wherein upon the occurrence of a database failure (e.g., power failure or process failure) data maintained in the database cache may not survive, losing, in effect, the frequently accessed data used to process access requests. Upon recovery, the database system may process access requests with few to none database cache hits, which may slow the processing of access requests as the cache may no longer maintain the frequently accessed data requests (also referred to as the database cache being cold).

FIG. 1A is a series of block diagrams illustrating a database cache without survivability across database failures. As illustrated at 102, access requests 112 (e.g., read or write requests) may be received at a database 100. Database 100 may implement a database engine 110 which may, among other functions, process access requests 112. As part of processing access requests, database engine 110 may perform cache reads/writes 132 using warm database cache 120 for cache hits. Warm database cache 120, as noted above, may already maintain frequently accessed data maintained by the database as part of database storage 120. Warm database cache 120 may be persisted as part of system memory (or some other form of volatile memory) for one or more computing devices implementing database 100.

A database failure 142 is illustrated at 104. Database engine 110 may, for instance, be a process performed on a computing device that may have become halted or frozen (such as due to some form of deadlock among threads) and may need to be restarted. Alternatively, a larger system failure, such as a power failure or other type of failure of the computing device implementing database 100, may also occur. However database failure 142 occurs, the database cache is no longer warm, having lost the frequently accessed data of the database as a result of database failure 142, becoming a cold database cache 130. As illustrated at 106, upon recovery from the database failure database 100 may once again receive access requests 112. Cold database cache 130 may be available for reads/writes 146 from database engine 110, however, many cache misses may occur, requiring access of database storage 150 in order to restore cache entries 148 to the cold database cache 130. This warming process of restoring a cold database cache to a warm state may hinder access request 112 processing. Moreover, it may be difficult to determine when cold database cache 130 is no longer cold, but has returned to a warm state.

Figure 1B:
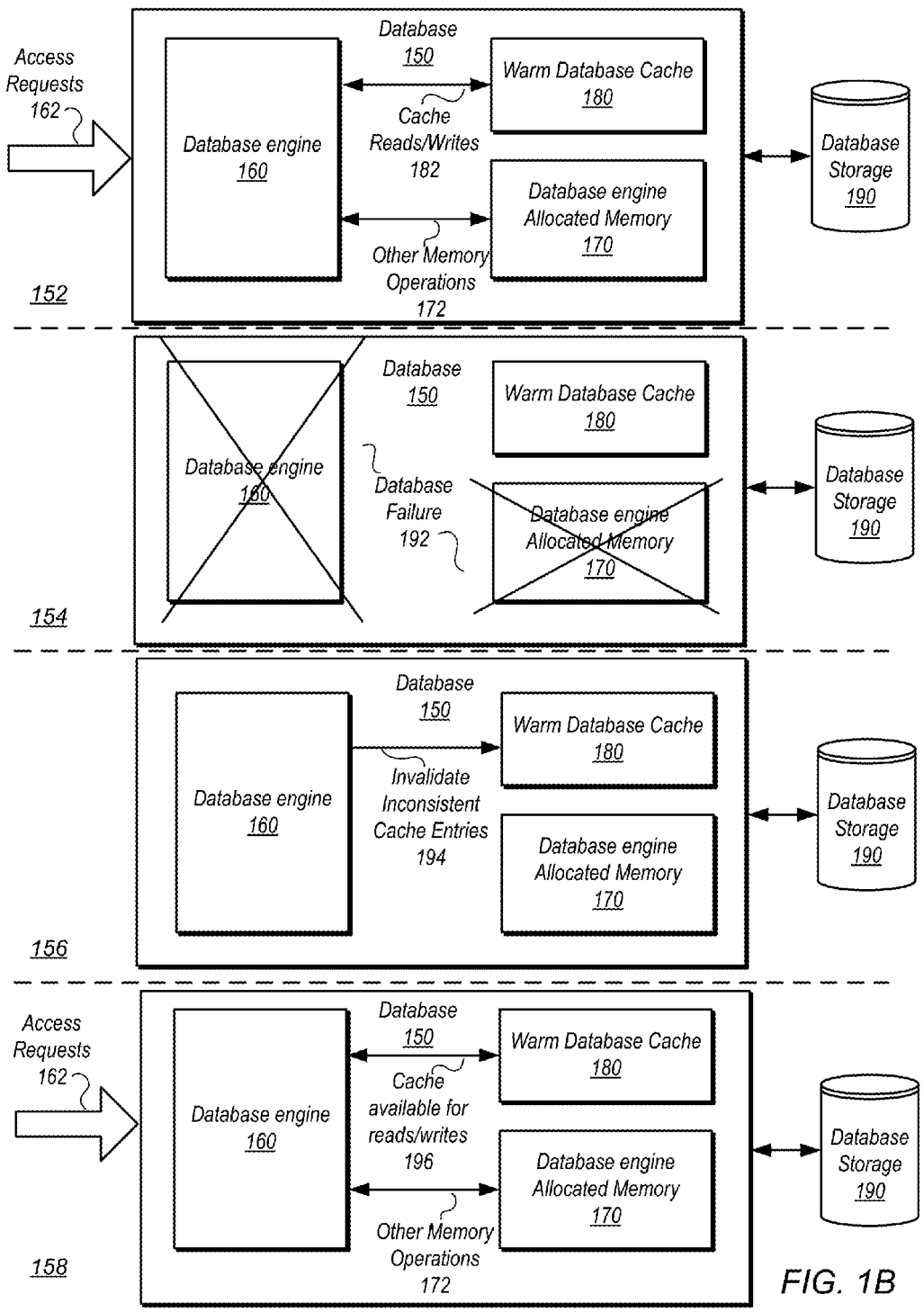
FIG. 1B is a series of block diagrams illustrating database cache survivability across database failures according to some embodiments.

In various embodiments, a database may implement database cache survivability across database failures. FIG. 1B is a series of block diagrams illustrating database cache survivability across database failures, according to some embodiments. Database 150 may receive one or more access requests 162 for processing. Similar to database 100 illustrated in FIG. 1A, database 150 may also implement a database engine, database engine 160 which may process access requests 162, among other functions. As part of processing access requests 162, database engine 160 may perform various cache reads/writes 182 (for cache hits) with regard to warm database cache 180. For cache misses, database storage 190 (typically one or more persistent storage devices) may be accessed to process the access requests 162. Database engine 160 may also perform various other actions or functions some of which may involve other memory operations 172 upon database engine allocated memory 170. Database engine allocated memory 170 may, in various embodiments, be a portion of system memory specifically allocated to database engine 160 for performing various functions.

Independent from database engine allocated memory 170, database 150 may also implement warm database cache 180. As noted above, warm database cache 180 may maintain frequently accessed data for database 150. In some embodiments, warm database cache 180 may be implemented as a shared segment of system memory. A shared segment of system memory may be a portion of system memory that is maintained independent of processes that may have access to the shared segment. In the event of a failure of one or more of the processes that access the shared memory segment, the data maintained by the shared memory segment may still be available. For example, in various embodiments database engine 160 may be a process that accesses both its own specifically allocated memory, database engine allocated memory 170, and warm database cache 180. As illustrated at 154, a database failure 192 may occur that causes the process of the database engine 160 to fail. Database engine allocated memory 170 may also fail as it is specifically allocated to database engine 160 and is maintained so long as database engine 160 is functioning. However, warm database cache 180 may still survive database failure 192, as it is implemented in a shared memory segment, which may be maintained independent from database engine 160.

In another example, warm database cache 180 may be implemented on a non-volatile memory device which may preserve data irrespective of system or other failure of database 192, such as a power failure, that causes the loss of all data maintained in non-volatile storage. A non-volatile memory device may be one of many different types of memory, which may implement the same, similar, or near-system memory like performance characteristics for access operations. Examples may include, but are not limited to, Non-Volatile Random Access Memory (NV-RAM) or some other form of battery-backed memory device which may implement flash-based storage to maintain data stored in system memory in the event of a system failure, as well as various post-nand flash technologies, such as ferroelectric random access memory (Ferroelectric RAM), magnetoresistive random access memory (MRAM), resistive random access memory (Resistive RAM), and/or phase-change random access memory (PC-RAM). Please note that the terms similar or near-system memory performance are not intended to be limiting to any specific set of characteristics or attributes. As the performance characteristics of system memory may vary widely, so too may the characteristics or attributes of memory relative to typical system memory devices such as dynamic random access memory (DRAM), or static random access memory (SRAM), in addition to countless varieties of these and other random access memory technologies, including, but not limited to dual in-line memory module (DIMM), synchronous dynamic random access memory (SDRAM), double data rate synchronous random access memory (DDR-SDRAM). As a result of implementing warm database cache 180 on a non-volatile memory device, such as the examples given above, warm database cache 180 may survive database failure 192.

As illustrated at 156, database 150 may recover from database failure 192. Upon recovery from database failure 192, database engine 160 may determine a recovery point for the database cache. In various embodiments, a recovery point may be (or determined based on) a consistent state of the database prior to database failure 192. Once a recovery point is identified, For instance, database 150 may have started processing (such as by updating entries of warm database cache 180 prior to database failure 192) but not yet committed (i.e. made durable) some access requests 162 (or operations/transactions resulting from access requests 162). Uncommitted access requests 162, transactions, or other database operations may not be consistent with the data stored at database storage 190. In order to prevent inconsistent (and possibly erroneous) versions of the entries in warm database cache 180 from being used to process access requests, inconsistent cache entries may be invalidated 194 (e.g., marked as invalid, removed, etc.) from warm database cache 180. In at least some embodiments, cache entries may be invalidated lazily, such as when an access request for a specific cache entry is received.

In some embodiments, database storage 190, implemented as distributed storage service described in FIGS. 2-4 below, may maintain a consistent state of the database. A request to database storage, for example, may, in some embodiments, return an identifier, such as log sequence number, that indicates a consistent state of the database. In some embodiments, a consistent state of the database may be determined by scanning one or more log records indicating updates made to data of which the cache entries maintain versions or copies of in order to locate a consistency point (e.g., a particular log sequence number (LSN)) of the database. However a consistent state is determined, it may be used as part of identifying and/or determining the recovery point.

As illustrated at 158, warm database cache 180 is once again available for database engine 160 to access when processing access requests. Valid cache entries from before the database failure may be retained, in some embodiments. Note, that in various embodiments, these valid cache entries may be made available for servicing access requests without accessing a back-end data stored, such as database storage 190. Thus, recovery from database failure 192 may be performed without accessing, or receiving data from database storage 190, as valid data may still be maintained in the warm database cache 180. In other embodiments, warm database cache 180 may maintain identifiers of data for cache entries, such as the particular data pages (or blocks) maintained in database storage 190, that are also stored in a database cache in system memory, such as in database engine allocated memory 170. Although not illustrated, upon recovery database engine 160 may access these identifiers in warm database cache 180, restore copies of the data, such as the data pages, from database storage 190, to the cache in database engine allocated memory 170. Thus, the cache in database engine allocated memory 170 may be warm for processing access requests without waiting to warm the cache over time when processing cache misses.

Although various embodiments of database cache survivability across database failures may be implemented in many different database systems, the specification first describes an example network-based database service configured to implement database cache survivability across database failures. Included in the description of the example network-based database service are various aspects of the example network-based database service, such as a database engine and a separate distributed database storage service. The specification then describes a flowchart of various embodiments of methods for database cache survivability across database failures. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In some embodiments, the database systems described herein may retain functions such as query parsing and optimization, query execution, and transactionality and consistency, but may redistribute responsibility for at least portions of the backup, restore, snapshot, recovery, and/or various space management operations to a storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed.

In some embodiments, the database tier (or more specifically, the database engine head node) may include a cache in which recently accessed data pages are held temporarily, such as warm cache 180 described above with regard to FIG. 1B. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
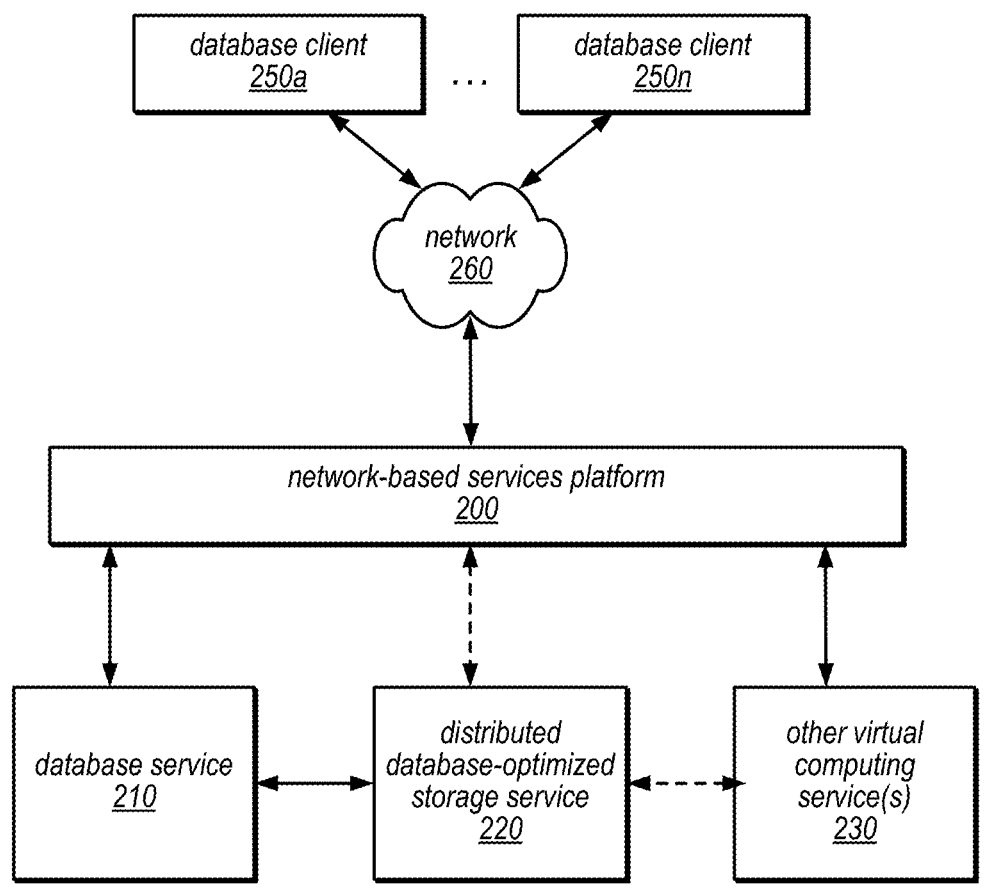
FIG. 2 is a block diagram illustrating a service system architecture that may be configured to implement a network-based services-based database service, according to some embodiments.

One embodiment of a service system architecture that may be configured to implement a network-based database service is illustrated in FIG. 2. In the illustrated embodiment, a number of clients (shown as database clients 250a-250n) may be configured to interact with a network-based services platform 200 via a network 260. Network-based platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to network-based services platform 200 via network 260, including requests for database services (e.g., access requests, a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable network-based services architecture.

In some embodiments, a client 250 (e.g., a database service client) may be configured to provide access to web services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed database-optimized storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, web services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed database-optimized storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing databases on behalf of clients 250 may be transparent to those clients. In other embodiments, distributed database-optimized storage service 220 may be exposed to clients 250 through network-based services platform 200 to provide storage of databases or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
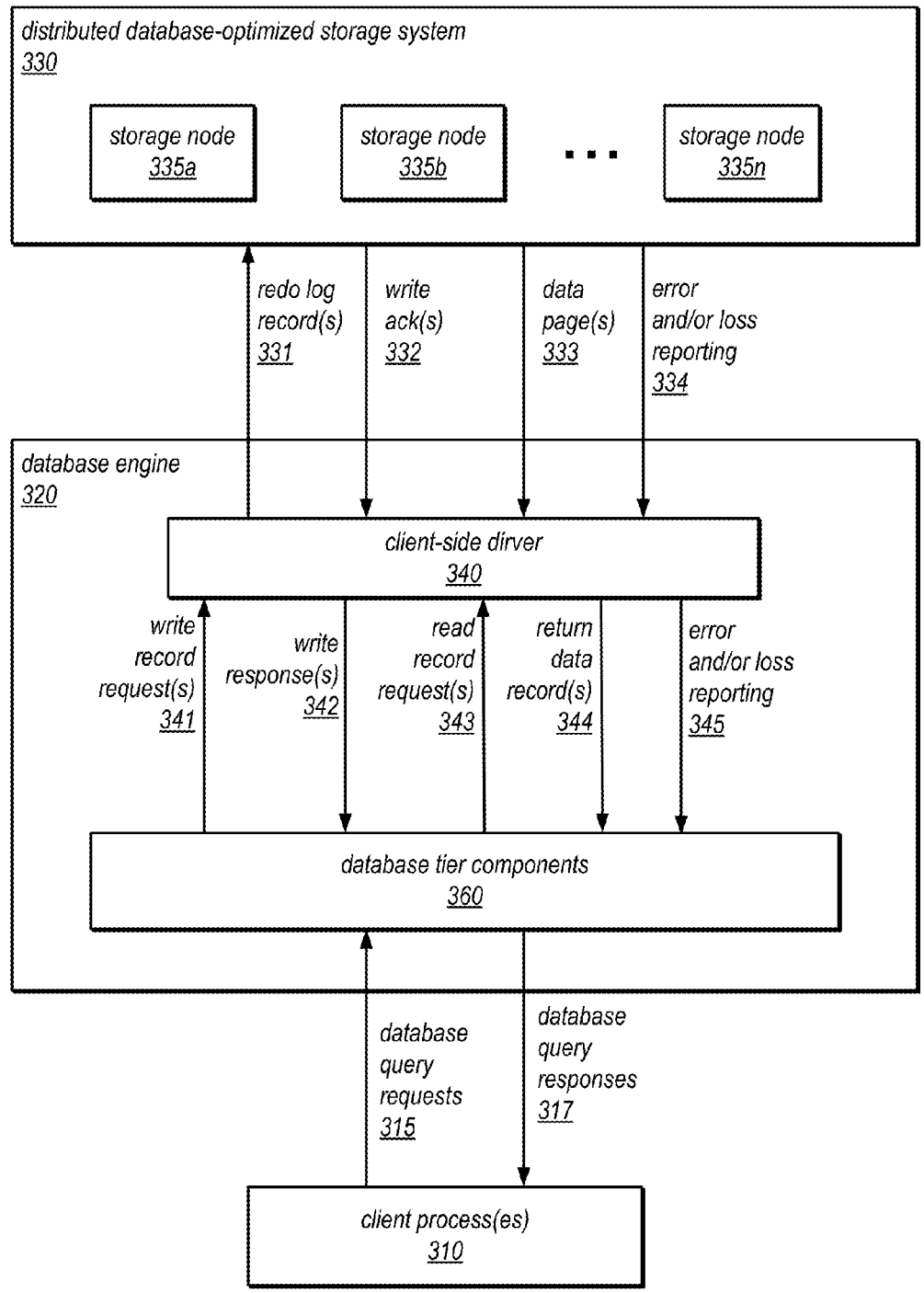
FIG. 3 is a block diagram illustrating the use of a separate distributed database-optimized storage system in a database system, according to some embodiments.

FIG. 3 is a block diagram illustrating the use of a separate distributed database-optimized storage system in a database system, according to some embodiments. In this example, one or more client processes 310 may store data to one or more databases maintained by a database system that includes a database engine 320 and a distributed database-optimized storage system 330. In the example illustrated in FIG. 3, database engine 320 includes database tier components 360 and client-side driver 340 (which serves as the interface between distributed database-optimized storage system 330 and database tier components 360). In some embodiments, database tier components 360 may perform functions such as those performed by query parsing, optimization and execution component 405 and transaction and consistency management component 430 of FIG. 4, and/or may store data pages, transaction logs and/or undo logs (such as those stored by data page cache 435, transaction log 440 and undo log 445 of FIG. 4).

In this example, one or more client processes 310 may send database query requests 315 (which may include read and/or write requests targeting data stored on one or more of the storage nodes) to database tier components 360, and may receive database query responses 317 from database tier components 360 (e.g., responses that include write acknowledgements and/or requested data). Each database query request 315 that includes a request to write to a data page may be parsed and optimized to generate one or more write record requests 341, which may be sent to client-side driver 340 for subsequent routing to distributed database-optimized storage system 330. In this example, client-side driver 340 may generate one or more redo log records 331 corresponding to each write record request 341, and may send them to specific ones of the storage nodes 335 of distributed database-optimized storage system 330. Distributed database-optimized storage system 330 may return a corresponding write acknowledgement 323 for each redo log record 331 to database engine 320 (specifically to client-side driver 340). Client-side driver 340 may pass these write acknowledgements to database tier components 360 (as write responses 342), which may then send corresponding responses (e.g., write acknowledgements) to one or more client processes 310 as one of database query responses 317.

In this example, each database query request 315 that includes a request to read a data page may be parsed and optimized to generate one or more read record requests 343, which may be sent to client-side driver 340 for subsequent routing to distributed database-optimized storage system 330. In this example, client-side driver 340 may send these requests to specific ones of the storage nodes 335 of distributed database-optimized storage system 330, and distributed database-optimized storage system 330 may return the requested data pages 333 to database engine 320 (specifically to client-side driver 340). Client-side driver 340 may send the returned data pages to the database tier components 360 as return data records 344, and database tier components 360 may then send the data pages to one or more client processes 310 as database query responses 317.

In some embodiments, various error and/or data loss messages 334 may be sent from distributed database-optimized storage system 330 to database engine 320 (specifically to client-side driver 340). These messages may be passed from client-side driver 340 to database tier components 360 as error and/or loss reporting messages 345, and then to one or more client processes 310 along with (or instead of) a database query response 317.

In some embodiments, the APIs 331-334 of distributed database-optimized storage system 330 and the APIs 341-345 of client-side driver 340 may expose the functionality of the distributed database-optimized storage system 330 to database engine 320 as if database engine 320 were a client of distributed database-optimized storage system 330. For example, database engine 320 (through client-side driver 340) may write redo log records or request data pages through these APIs to perform (or facilitate the performance of) various operations of the database system implemented by the combination of database engine 320 and distributed database-optimized storage system 330 (e.g., storage, access, change logging, recovery, and/or space management operations). Distributed database-optimized storage system 330 may store data blocks on storage nodes, each of which may have multiple attached SSDs. In some embodiments, distributed database-optimized storage system 330 may provide high durability for stored data block through the application of various types of redundancy schemes.

Note that in various embodiments, the API calls and responses between database engine 320 and distributed database-optimized storage system 330 (e.g., APIs 431-434) and/or the API calls and responses between client-side driver 340 and database tier components 360 (e.g., APIs 341-345) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 320 and/or distributed database-optimized storage system 330.

As noted above, in some embodiments, the functional components of a database system may be partitioned between those that are performed by the database engine and those that are performed in a separate, distributed, database-optimized storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed database-optimized storage service and to send it to the distributed database-optimized storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 4:
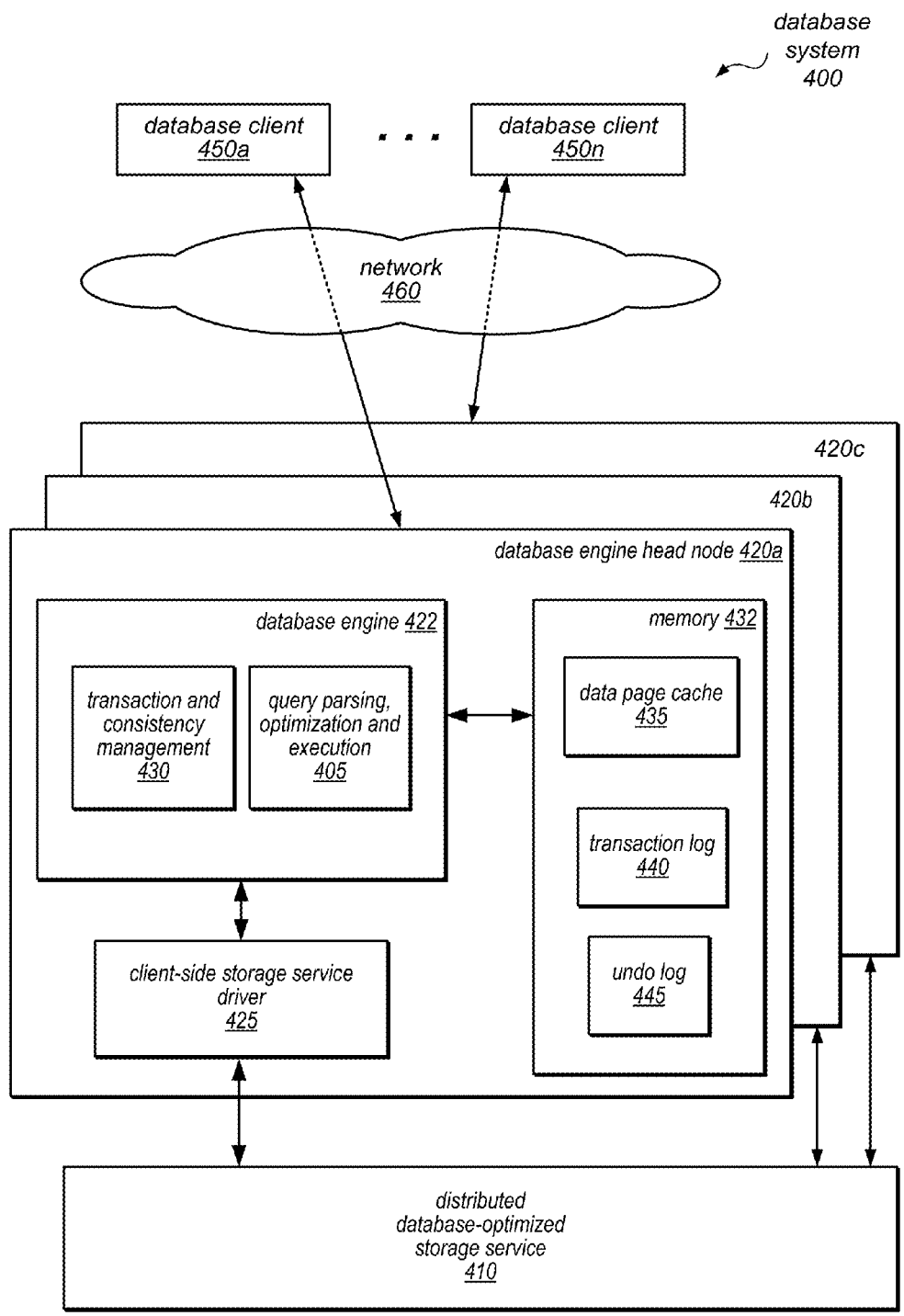
FIG. 4 is a block diagram illustrating various components of a database system that includes a database engine and a separate distributed database storage service, according to some embodiments.

FIG. 4 is a block diagram illustrating various components of a database system that includes a database engine and a separate distributed database storage service, according to some embodiments. In this example, database system 400 includes a respective database engine head node 420 for each of several databases and a distributed database-optimized storage service 410 (which may or may not be visible to the clients of the database system, shown as database clients 450a-450n). As illustrated in this example, one or more of database clients 450a-450n may access a database head node 420 (e.g., head node 420a, head node 420b, or head node 420c, each of which is a component of a respective database instance) via network 460 (e.g., these components may be network-addressable and accessible to the database clients 450a-450n). However, distributed database-optimized storage service 410, which may be employed by the database system to store data pages of one or more databases (and redo log records and/or other metadata associated therewith) on behalf of database clients 450a-450n, and to perform other functions of the database system as described herein, may or may not be network-addressable and accessible to the storage clients 450a-450n, in different embodiments. For example, in some embodiments, distributed database-optimized storage service 410 may perform various storage, access, change logging, recovery, log record manipulation, and/or space management operations in a manner that is invisible to storage clients 450a-450n. Distributed database-optimized storage service 410 may, in some embodiments, be configured to maintain a consistent state of databases for which the service stores data.

As previously noted, each database instance may include a single database engine head node 420 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 4, a query parsing, optimization, and execution component 405 of database engine head node 420a may perform these functions for queries that are received from database client 450a and that target the database instance of which database engine head node 420a is a component. In some embodiments, query parsing, optimization, and execution component 405 may return query responses to database client 450a, which may include write acknowledgements, requested data pages (or portions thereof), error messages, and or other responses, as appropriate. As illustrated in this example, database engine head node 420a may also include a client-side storage service driver 425, which may route read requests and/or redo log records to various storage nodes within distributed database-optimized storage service 410, receive write acknowledgements from distributed database-optimized storage service 410, receive requested data pages from distributed database-optimized storage service 410, and/or return data pages, error messages, or other responses to query parsing, optimization, and execution component 405 (which may, in turn, return them to database client 450a).

In this example, database engine head node 420a includes a data page cache 435, in which data pages that were recently accessed may be temporarily held, such as also described above with regard to warm database cache 180 in FIG. 1. Database engine head node may implement memory 432, which may be one or more memory components or devices implemented on a computing system, such as those discussed below with regard to FIG. 7. Memory 432 may also be one or more components or devices discussed with regard to FIGS. 5A and 5B. Various different methods or techniques may be performed (e.g., by database engine 422) with regard to database cache 435, such as discussed below with regard to FIG. 6 FIGS. 5A-5C discussed below describe some of the various ways database cache 435 may be implemented in order to survive across database failures.

As illustrated in FIG. 4, database engine head node 420a may also include a transaction and consistency management component 430, which may be responsible for providing transactionality and consistency in the database instance of which database engine head node 420a is a component. For example, this component may be responsible for ensuring the Atomicity, Consistency, and Isolation properties of the database instance and the transactions that are directed that the database instance. As illustrated in FIG. 4, database engine head node 420a may also include a transaction log 440 and an undo log 445, which may be employed by transaction and consistency management component 430 to track the status of various transactions and roll back any locally cached results of transactions that do not commit. Various records from transaction log 440 and undo log 445 may also be used to determine a recovery point for a database cache, as discussed below with regard to FIG. 6. Although illustrated as included in memory 432, transaction log 440 and undo log 445 may, in some embodiments, be maintained in separate portions or devices of memory than data page cache 435.

Note that each of the other database engine head nodes 420 illustrated in FIG. 4 (e.g., 420b and 420c) may include similar components and may perform similar functions for queries received by one or more of database clients 450a-450n and directed to the respective database instances of which it is a component.

In some embodiments, the distributed database-optimized storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed database-optimized storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 5A:
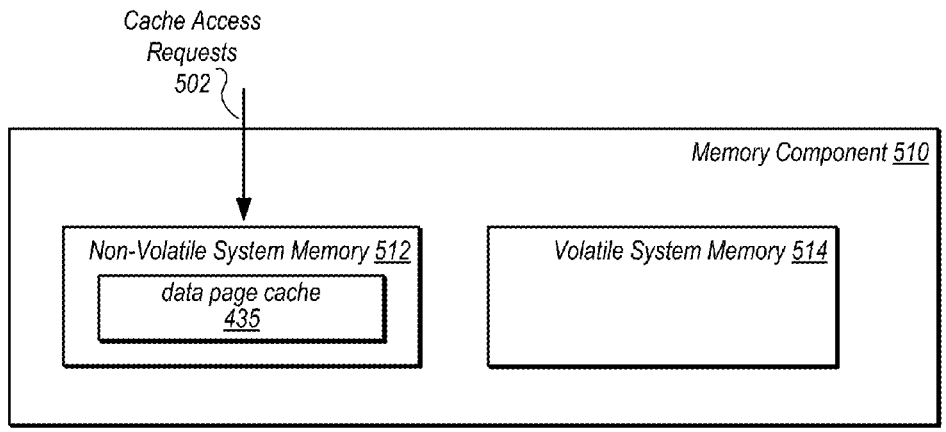
FIGS. 5A-5C illustrate example memory components configured to implement database cache survivability across database failures, according to some embodiments.
Figure 5B:
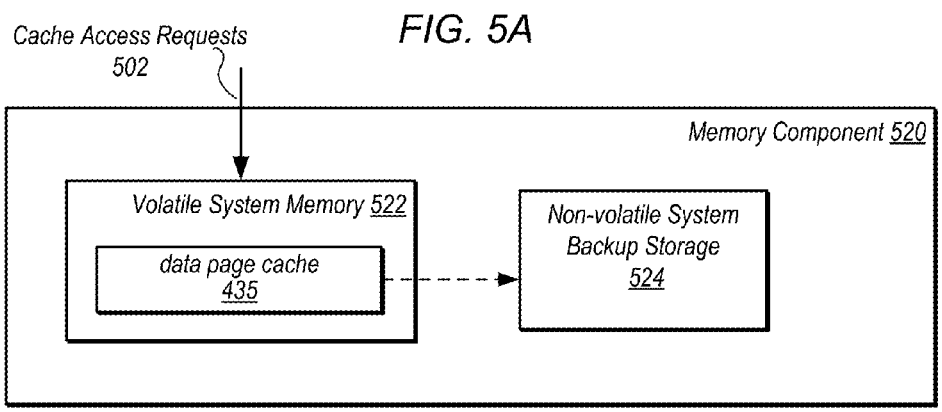
Figure 5C:
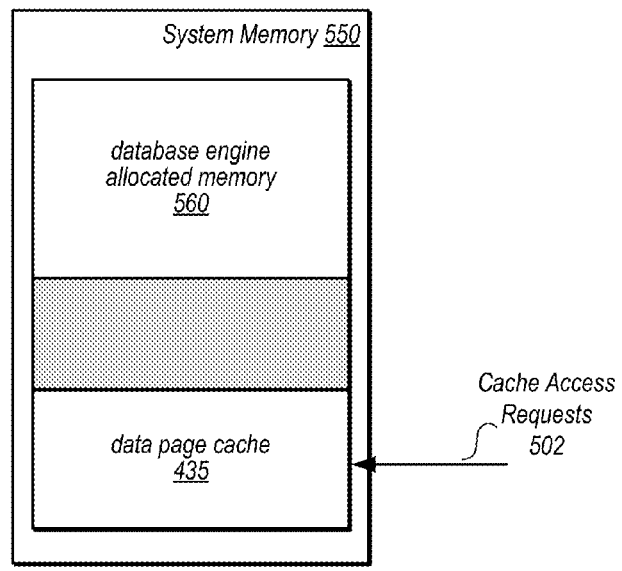

As illustrated above in FIG. 4, a database engine head node may implement a database cache 435 in order to service access requests for frequently accessed data without requesting the data from storage service 410. FIGS. 5A-5C illustrate example memory components configured to implement database cache survivability across database failures, according to some embodiments. Although discussed in the context of a network-based database service, memory components 510, 520, and/or system memory 550 may be implemented in a variety of different database systems and are not limited to network-based database services.

FIG. 5a illustrates a memory component 510 that implements both non-volatile system memory 512 and volatile system memory 514. Memory component 510 may be single specialized device, such as a device that implements non-volatile system memory 512 and volatile system memory 514 as sub-components on the same physical device, or memory component 510 may be a logical grouping or mapping to separate components, such as individual devices for non-volatile system memory 512 and volatile system memory 514, that may communicate with other system components over a common interface (e.g., multiple memory slots on a system board). Please note that for all of the subsequent discussion regarding FIGS. 5A-5C, individual components are not limited to one device or component but may be a combination of different numbers of devices. For example, non-volatile system memory 512 may be implemented by two devices, while volatile system memory 514 may be implemented by three devices.

Volatile system memory 514 may be implemented using a variety of different conventional system memory technologies, components, or devices. System memory devices including, but not limited to, dynamic random access memory (DRAM), or static random access memory (SRAM), may be used in order to implement volatile-system memory 514 as well as countless varieties of these and other random access memory technologies, including, but not limited to dual in-line memory module (DIMM), synchronous dynamic random access memory (SDRAM), double data rate synchronous random access memory (DDR-SDRAM).

Non-volatile system memory 512 may be implemented using a variety of different non-volatile memory technologies that provide similar or near conventional system memory performance characteristics. For instance, if non-volatile system memory 512 may be within various ranges of read and/or write speed that are only a certain percentage slower than conventional system memory performance. As mentioned above, conventional system memory performance may vary, and thus the following examples are not intended to be limiting. In some embodiments, Ferroelectric RAM may be used as non-volatile storage memory 512. Generally, ferroelectric RAM may implement a ferroelectric layer in order to store data in storage elements (e.g., storage cells). In some embodiments, MRAM may be used as non-volatile memory 512. Generally, MRAM may implement ferromagnetic plates to store data in storage elements. In some embodiments, resistive random access memory may be used as non-volatile memory 512. Resistive random access memory may generally implement resistive memory cells, which can conduct through a dielectric switching between high or low resistance. In some embodiments, phase-change random access memory may be used to implement non-volatile system memory 512. Generally, phase-change random access memory implements chalcogenide glass in low resistance and high resistance states.

As illustrated in FIG. 5A, non-volatile system memory 512 may implement data page cache 435. Cache access requests 502, such as various read/write operations, may be performed according to the various different mechanisms or protocols of non-volatile system memory 512. In the event of database failure, such as a power failure of the computing device implementing the database, non-volatile system memory may preserve the data, maintaining a warm database cache. In some embodiments, data may be persisted without a power or other energy supply to the non-volatile system memory 512. Then upon recovery from the database system failure, non-volatile system memory 512 may be directly accessed by the database in order to invalidate inconsistent cache entries with a determined recovery point and make the database cache available for processing access requests. Valid cache entries from before the database failure may be made available without rebuilding the database cache in various embodiments.

Turning now to FIG. 5B, in some embodiments data page cache 435 may be implemented in a memory component 520 that implements non-volatile system backup storage 524 for data persisted in volatile system memory 522. Various different components or devices may implement data backup for system memory, such as non-volatile random access memory (NV-RAM) or other battery or super-capacitor backed memory devices (e.g., NV-DIMM). Generally, non-volatile system backup storage 524 may be a flash-based storage device that communicates with volatile system memory, such as SRAM or DRAM. In the event of a system failure, a controller or other device copies data from volatile system memory 522 to non-volatile system backup storage 524 (as depicted by the dotted arrow). Thus, in some embodiments, data page cache 435 may be maintained in the event of database failure, maintaining a warm state of the database cache. In at least some embodiments, the data page cache 435 may be accessed and/or restored from non-volatile system backup storage 524 to volatile system memory 522 in order to process cache access requests 502 upon recovery from a database failure.

Turning now to FIG. 5C, in some embodiments, data page cache 550 may be implemented as part of system memory 550. System memory 550 may be one or more conventional system memory types, such as dynamic random access memory (DRAM), or static random access memory (SRAM), as well as countless varieties of these and other random access memory technologies, including, but not limited to dual in-line memory module (DIMM), synchronous dynamic random access memory (SDRAM), double data rate synchronous random access memory (DDR-SDRAM). System memory 500 may, as part of an operating system component, memory allocation component, or some other system component allocate system memory, such as a block of memory allocated via a virtual memory management technique, to one or more processes operating on computing device implementing a database. For example, database engine 422 may be a process performing on one or more computing devices implementing database engine head node 420*a*. Various other processes may also be concurrently performing on the computing device, such as client-side storage service driver 425.

The shaded portion of system memory 550 represents other various portions of memory 550 that are allocated to these other processes as well as unallocated portions of memory. A portion of system memory may also be specifically allocated to a database engine process, as illustrated at 560 in FIG. 5C. Database engine allocated memory 560 may include program instructions and or other data necessary to perform the various functions of the database engine process. In at least some embodiments, data page cache 335 may be implemented in a shared memory segment in system memory that is accessible by other processes (including the database engine process) and yet independent of those processes. For example, if the database engine process deadlocks, fails, or is otherwise stopped, database engine allocated memory 560 which is allocated solely to the database engine process may be deallocated, thus losing the data stored in the portion of allocated memory 560. Data page cache 435, however, is in an independent segment of memory, and thus a memory manager, operation system, or other memory allocation component may continue to maintain the data page cache 435 irrespective of the failure of the database engine process, or other processes performing on the computing device implementing the database. Thus, when processing cache access requests 502, data page cache 435 may remain warm even in the event of a failure of the database engine process.

Figure 6:
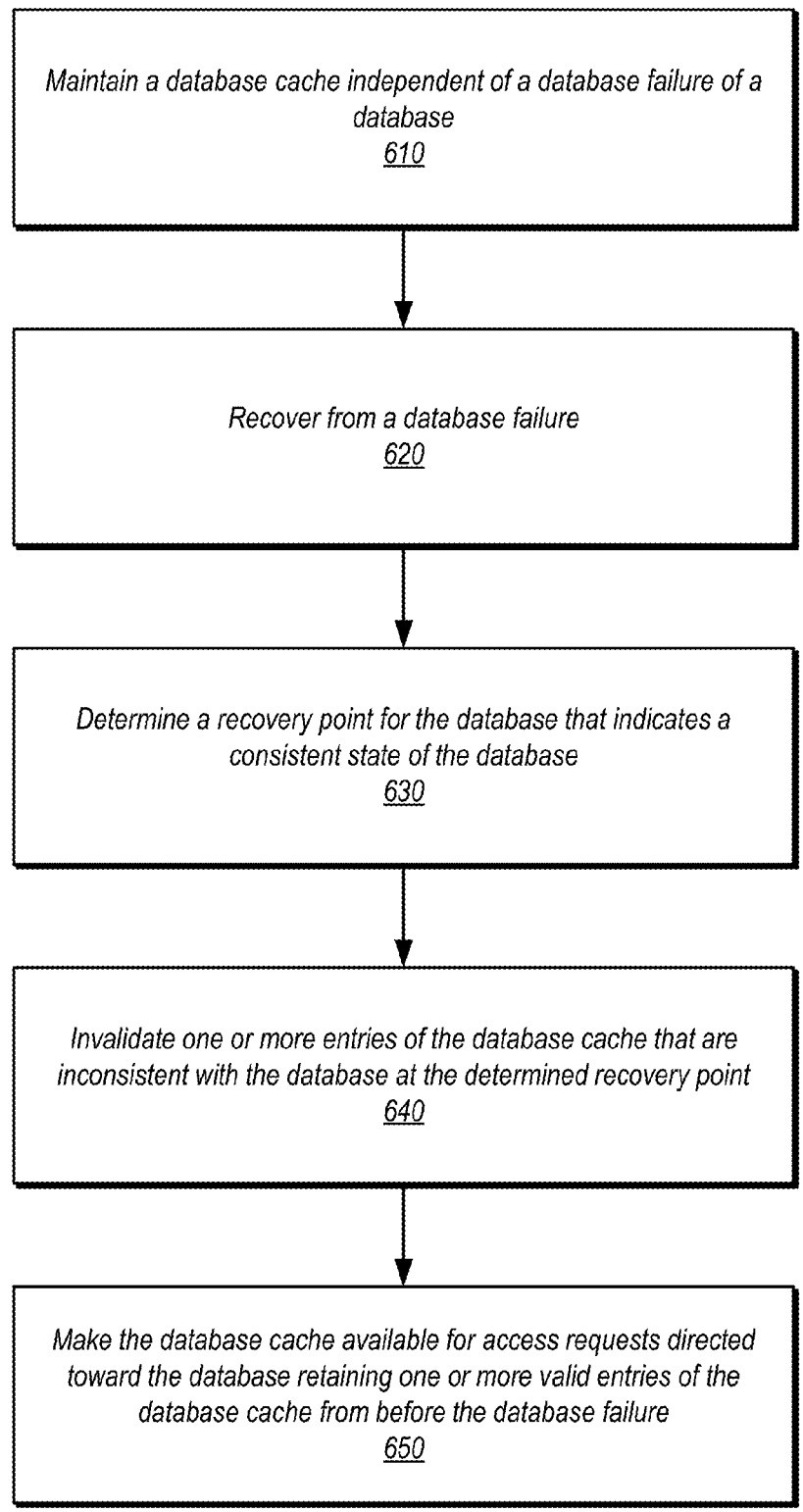
FIG. 6 is a high-level flowchart of various techniques to implement database cache survivability across database failures, according to some embodiments.

The previous examples of a network-based database service given above describe various embodiments of a database system that may implement database cache survivability across database failures. The various methods and techniques discussed above, as well as the various components implementing those techniques, such as database engine 422, and the various different memory configurations illustrated in FIGS. 5A-5C may also be implemented on a wide variety of different database systems. These components, along with many other components may be configured to implement methods and techniques to ensure database cache survivability across database failures. FIG. 6 is a high-level flowchart of various techniques to implement database cache survivability across database failures, according to some embodiments.

As indicated at 610, in various embodiments, a database cache may be maintained independent of a database failure of a database. A database cache, as discussed above, may generally provide frequently accessed data for a database to process access requests without accessing a back-end data store, such as one or more persistent storage devices or distributed data storage service discussed above with regard to FIGS. 2-4. Typically, database caches include a plurality of cache entries, each of which may contain a respective copy or version of data, such as a database page, that is persistently stored in a back-end data store, such as on one or more persistent storage devices accessible by a database system, or persisted as part of a storage system, such as storage service discussed above with regard to FIGS. 2-4. Accessing a database cache may be performed much more efficiently than accessing data persisted in storage back-end data store, as typically devices maintaining a database cache are/have faster read/write performance capabilities (in addition to being locally accessible to computing devices implementing a database).

Maintaining a database cache may, in some embodiments, be implementing by storing the database cache on one or more non-volatile memory devices, such as those described above with regard to FIGS. 5A and 5B. Non-Volatile Random Access Memory (NV-RAM) or some other form of battery-backed memory device which may implement flash-based storage to maintain data stored in system memory irrespective of a system failure, as well as various post-nand flash technologies, such as ferroelectric random access memory (Ferroelectric RAM), magnetoresistive random access memory (MRAM), resistive random access memory (Resistive RAM), and/or phase-change random access memory (PC-RAM) are just some examples of various different kinds of non-volatile memory storage devices that may be implemented to preserve a database cache irrespective of database failure. Please note that flash-based technologies with similar, or near system memory performance may also be used as a non-volatile memory device to maintain a warm database cache.

In some embodiments, maintaining a database cache may be performed by storing a database cache in a shared memory segment of system memory. As discussed above with regard to FIG. 5C, a shared memory segment may be accessed by multiple processes. However, irrespective of a failure of one or more of the processes accessing the shared memory segment, such as the database process or other process that interacts with the database cache, the shared memory segment may still maintain the data stored within the shared memory segment. Thus, a database cache maintained in shared memory segment may be maintained irrespective of a failure of a database engine process or other process accessing the database cache. A shared memory segment, or other out-of-process (with respect to a database engine process) may be implemented to maintain a warm database cache in the event of a failure of the database engine process.

As indicated at 620, a database failure may be recovered from. Various types of database failures may occur. For example, in some embodiments, database failures may be a failure of a database engine process or other process that process access requests or accesses a database cache. A process failure may have any number of causes, such as deadlock. In at least some embodiments, a process failure may be initiated by an operator, external system, or other component located on the computing device implementing the database engine process. Another example of database failure may be a system or power failure. System or power failures, in various embodiments, may cause system memory implemented as part of a computing device implementing a database to lose power and thus, a loss data maintained in system memory.

Upon recovery from a database failure, a recovery point may be determined that indicates a consistent state of the database, as indicated at 630. A recovery point may be determined, in some embodiments, based at least in part, on a consistent state of the database. A consistent state, or indicator of the consistent state, of the database may be received from database storage, such as storage service described above with regard to FIGS. 2-4. For example, in some embodiments, database storage may maintain an indicator or value, such as a Log Sequence Number, which may indicate the consistent state of the database in database storage. Various types of log records accessible to a database engine process, for instance the undo log records and the transaction log records discussed above with regard to FIG. 4, may then be used to determine a recovery point for the database using the LSN. In various embodiments, a recovery point may be determined by scanning one or more log records to a previous state of the database. For example, redo log records, undo log records, and transaction records may be maintained as part of a write-ahead logging recovery schema in a database. Upon recovery from a database failure, recovery algorithms, such as Algorithms for Recovery and Isolation Exploiting Semantics (ARIES), may be used to scan the various log records to locate a consistent point of the database. In at least some embodiments, a consistent point of the database may be represented by an LSN.

In at least some embodiments, one or more entries of the database cache that are inconsistent with the database at the determined recovery point may be invalidated, as indicated at 640. Invalidating cache entries may be performed by marking inconsistent entries, such as by changing a value in the entry or a value in metadata describing the entry, or by removing, erasing, or otherwise making inaccessible the inconsistent cache entry. Determining particular cache entries to be invalidated may be performed by evaluating a state identifier, such as a sequence number, to be compared with the determined recovery point. For example, each cache entry may include a sequence number. The entries of the database cache may then be compared with an LSN that is determined to be the recovery point for the database. For those entries with sequence numbers inconsistent with the LSN, the cache entry may be invalidated. In at least some embodiments, cache entries may be invalidated lazily. For instance, in some embodiments when an access request is received for a cache entry, the cache entry may be evaluated to determine whether the cache entry is inconsistent with the recovery point. This may be performed multiple times for different cache entries, invalidating inconsistent cache entries on-the-fly.

As indicated at 650, the database cache may then be made available for access requests directed toward the database, in various embodiments. Valid cache entries from before the database failure may be made available for servicing access requests. In at least some embodiments, the valid cache entries may be made available without accessing a back-end data store and/or rebuilding the valid cache entries from the back-end data store.

In at least some embodiments, a database cache may be maintained independent of a database failure by storing in a non-volatile memory device identifiers that identify respective data pages that are maintained in a database cache stored in volatile system memory. Upon recovery from a database failure, the identifiers may be accessed to determine the warm state of the database cache in volatile system memory at the time of the database failure. The identified data pages may be obtained from database storage and restored to the database cache in system memory. In some embodiments, upon restoring the data pages to the database cache, the database cache may be indicated as warm.

In at least some embodiments, a copy of the database cache may be maintained in system memory, in addition to a database cache maintained in a non-volatile memory device. Various updates may be performed at the database cache implemented in system memory. Corresponding updates may be made at the database cache maintained in the non-volatile memory device. For example, a write through policy may be applied where updates made to the database cache in system memory are concurrently made at the database cache maintained in the non-volatile memory device.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 7:
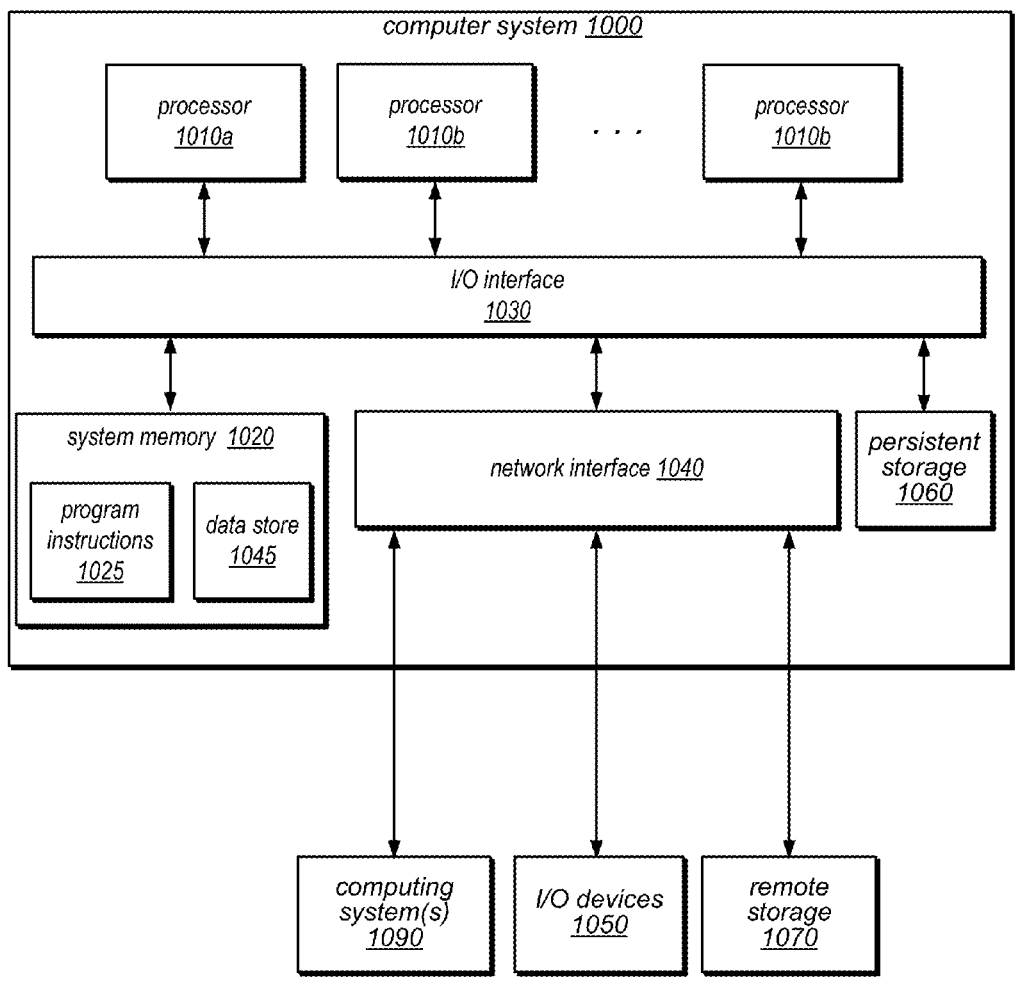
FIG. 7 is a block diagram illustrating a computer system, according to various embodiments.

FIG. 7 is a block diagram illustrating an example computer system, according to various embodiments. For example, computer system 1000 may be configured to implement a database engine head node of a database tier, or one of a plurality of storage nodes of a separate distributed database-optimized storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed database-optimized storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of nodes implementing a distributed database;
wherein at least one node is configured to implement:
database storage, configured to persistently maintain a plurality of data pages for the distributed database;
wherein at least one other node is configured to implement:
a database engine, configured to process one or more access requests directed toward the distributed database;
a database cache, configured to maintain a plurality of cache entries for processing one or more access requests, wherein contents of the database cache are preserved irrespective of a failure of the database engine, wherein each of the plurality of cache entries comprises a version of different ones of the plurality of data pages maintained at the database storage;
wherein the database engine is configured to:
upon recovery from a failure of the database engine:
determine a recovery point for the distributed database, wherein the recovery point indicates a consistent state for the distributed database;
invalidate one or more entries of the database cache that are inconsistent with the plurality of data pages persistently maintained in the database storage at the determined recovery point; and
make the database cache available for access requests directed toward the distributed database, wherein one or more valid cache entries of the database cache are retained from before the failure of the database engine.

2. The system of claim 1, wherein the database cache is implemented as part of a non-volatile memory device configured to preserve data irrespective of a power failure, and wherein the failure of the database engine is a power failure.

3. The system of claim 2, wherein the non-volatile memory device is:
a non-volatile random access memory device;
a ferroelectric random access memory device;
a magnetic random access memory device;
a resistive random access memory device; or
a phase-change random access memory device.

4. The system of claim 1, wherein the database cache is implemented in a shared segment of system memory that is accessible to one or more processes performing on the at least one node including the database engine, wherein the shared segment of system memory is configured to preserve data irrespective of an individual failure of the one or more processes including the database engine.

5. The system of claim 1,
wherein the at least one node implementing the database storage is part of a larger collection of nodes of the plurality of nodes implementing a distributed storage system maintaining the plurality of data pages for the distributed database, wherein the distributed storage system is configured to maintain a consistent state of the plurality of data pages;
wherein the at least one other node is a database engine head node configured to process the one or more access requests;
wherein, to determine a recovery point for the distributed database, the database engine head node is configured to:
request the consistent state of the plurality of data pages from the distributed storage system; and
evaluate the consistent state to identify the recovery point for the distributed database.

6. The system of claim 1, wherein the wherein the one or more valid cache entries of the database cache retained from before the failure of the database engine are made available for access requests directed toward the distributed database without accessing database storage.

7. A method, comprising:
performing, by one or more computing devices:
maintaining a database cache independent of a failure of a database, wherein the database cache comprises a plurality of cache entries for servicing access requests, wherein each of the plurality of cache entries comprises a version of data maintained for the database at a back-end data store;
upon recovery from a database failure:
determining a recovery point for the database, wherein the recovery point indicates a consistent state for the database;
invalidating one or more entries of the database cache that are inconsistent with the database at the determined recovery point; and
making the database cache available for access requests directed toward the database, wherein one or more valid cache entries of the database cache are retained from before the database failure.

8. The method of claim 7, wherein the database failure is a failure of the one or more computing devices, and wherein said maintaining the database cache independent of a failure of the database comprises storing the database cache on a non-volatile memory device that persists data irrespective of a failure of the one or more computing devices.

9. The method of claim 8, further comprising:
maintaining a copy of the database cache in system memory;
wherein said maintaining the database cache independent of a failure of the database comprises updating cache entries for the database cache stored on the non-volatile memory device to correspond to updates to cache entries performed at the copy of the database cache in system memory.

10. The method of claim 7, wherein said maintaining the database cache independent of a failure of the database comprises storing the database cache in a shared segment of system memory, wherein the shared segment of the system memory is accessible to one or more processes performing on the one or more computing devices including a database engine process, wherein the shared segment of the system memory maintains data irrespective of an individual failure of the one or more processes, and wherein the database failure is a failure of the database engine process.

11. The method of claim 7, wherein one or more log records indicating one or more updates to the database relative to a previous state of the database are maintained, and wherein said determining the recovery point for the database comprises scanning the one or more log records to locate a consistency point for the database in order to determine a consistent state for the database.

12. The method of claim 7, wherein said invalidating the one or more entries of the database cache that are inconsistent with the database at the determined recovery point is performed in response to an access request for the one or more entries of the database cache.

13. The method of claim 7, wherein the one or more computing devices implement a node of a plurality of nodes that together implement a distributed database service, wherein the node of the plurality of nodes is a database engine head node configured to process one or more access requests directed to the distributed database service, wherein each of the plurality of cache entries of the database cache comprises a version of a respective page of data stored among other nodes of the plurality of nodes implementing a distributed storage system for the distributed database service, and wherein the one or more valid cache entries of the database cache retained from before the database failure are made available for access requests directed toward the distributed database service without accessing the distributed storage system.

14. A non-transitory, computer-readable storage medium, storing program instructions that when executed by one or more computing devices implement a database engine process that implements:

maintaining a database cache independent of a failure of a database, wherein the database cache comprises a plurality of cache entries for servicing access requests, wherein each of the plurality of cache entries comprises a version of data maintained for the database at a back-end data store;

upon recovery from a database failure:

determining a recovery point for the database, wherein the recovery point indicates a consistent state for the database;

invalidating one or more entries of the database cache that are inconsistent with the database at the determined recovery point; and making the database cache available for access requests directed toward the database, wherein one or more valid cache entries of the database cache are retained from before the database failure.

15. The non-transitory, computer-readable storage medium of claim 14, wherein in said maintaining the database cache independent of a failure of the database, the database engine process implements storing the database cache on a non-volatile memory device that persists data irrespective of a failure of the one or more computing devices, and wherein the database failure is a failure of the one or more computing devices.

16. The non-transitory, computer-readable storage medium of claim 15, wherein the non-volatile memory device is:

a non-volatile random access memory device;
 a ferroelectric random access memory device;
 a magnetic random access memory device;
 a resistive random access memory device; or
 a phase-change random access memory device.

17. The non-transitory, computer-readable storage medium of claim 14, wherein in said maintaining the database cache independent of a failure of the database, the database engine process implements storing the database cache in a shared segment of system memory, wherein the shared segment of the system memory is accessible to one or more processes performing on the one or more computing devices including the database engine process, wherein the shared segment of the system memory maintains data irrespective of an individual failure of the one or more processes, and wherein the database failure is a failure of the database engine process.

18. The non-transitory, computer-readable storage medium of claim 14, wherein the one or more computing devices implement a node of a plurality of nodes that together implement a distributed database service, wherein the node of the plurality of nodes is a database engine head node configured to send one or more access requests to other nodes of the plurality of nodes implementing a distributed storage system, and wherein the distributed storage system is the back-end data store, wherein the distributed storage service maintains a plurality of data pages for the distributed database service.

19. The non-transitory, computer-readable storage medium of claim 18, wherein the distributed storage system is configured to maintain the consistent state of the database, and wherein, in said determining the recovery point for the database, the database engine process implements:

requesting the consistent state of the database from the distributed storage system to be utilized as the recovery point for the database.

20. The non-transitory, computer-readable storage medium of claim 14, wherein making the database cache available for access requests directed toward the database is performed without rebuilding the database cache in response to the database failure.

* * * * *